(12) United States Patent
Bhattacharjee et al.

(10) Patent No.: US 10,246,036 B2
(45) Date of Patent: Apr. 2, 2019

(54) SECONDARY BUMPER ASSEMBLY (71) Applicant: Ford Global Technologies, LLC, Dearborn, MI (US)

(72) Inventors: Sudip Sankar Bhattacharjee, Novi, MI (US); Mustafa Ahmed, Canton, MI (US); Mohammed Shenaq, Dearborn, MI (US); Martyn Swain, Ann Arbor, MI (US); Daehyun Hwang, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/639,177

(22) Filed: Jun. 30, 2017

(65) Prior Publication Data
US 2019/0001907 A1 Jan. 3, 2019

(51) Int. Cl.
*B60R 19/12* (2006.01)
*B60R 19/18* (2006.01)
*B60R 19/26* (2006.01)
*B60R 19/34* (2006.01)
*B60R 19/38* (2006.01)

(52) U.S. Cl.
CPC .............. *B60R 19/38* (2013.01); *B60R 19/12* (2013.01); *B60R 19/26* (2013.01); *B60R 19/34* (2013.01); *B60R 2019/1886* (2013.01)

(58) Field of Classification Search
CPC ......... B60R 19/12; B60R 19/24; B60R 19/26; B60R 19/34; B60R 19/38; B60R 2019/1886

USPC ......................... 293/116, 118, 144, 146, 133
See application file for complete search history.

(56) References Cited

U.S. PATENT DOCUMENTS

| | | | | |
|---|---|---|---|---|
| 2,672,363 | A | * | 3/1954 | Buchanan ............... B60R 19/14 293/118 |
| 5,678,872 | A | * | 10/1997 | Slater ....................... B60R 3/02 292/35 |
| 8,141,918 | B2 | | 3/2012 | Miller et al. |
| 8,950,800 | B1 | | 2/2015 | Farooq et al. |
| 9,290,142 | B1 | | 3/2016 | Faruque et al. |
| 9,327,779 | B1 | * | 5/2016 | Wey ..................... B62D 35/001 |
| 9,586,555 | B2 | | 3/2017 | Revankar et al. |
| 2002/0119002 | A1 | * | 8/2002 | Cordebar ............... B60R 19/24 403/329 |
| 2004/0183318 | A1 | * | 9/2004 | Bird ....................... B60R 19/38 293/149 |

(Continued)

FOREIGN PATENT DOCUMENTS

| | | |
|---|---|---|
| DE | 102008026335 A1 | 12/2009 |
| GB | 2384215 B | 5/2005 |
| WO | 2004103777 A1 | 12/2004 |

*Primary Examiner* — Gregory A Blankenship
(74) *Attorney, Agent, or Firm* — Frank A. MacKenzie; Bejin Bieneman PLC (57) ABSTRACT

A bumper assembly includes a crush can, a bumper extending along a longitudinal axis and supported by the crush can, and a secondary bumper assembly. The secondary bumper assembly is supportable by the bumper, and includes a secondary bumper that extends along the longitudinal axis, and a hand-actuated release supported by the secondary bumper having an arm attachable to the bumper. The arm is moveable between an engaged position for engagement with the bumper and a disengaged position for disengagement with the bumper.

19 Claims, 5 Drawing Sheets

(56) References Cited

U.S. PATENT DOCUMENTS

| | | | |
|---|---|---|---|
| 2004/0189025 A1* | 9/2004 | Iyoda | B60R 19/38 293/149 |
| 2008/0238142 A1* | 10/2008 | Braunbeck | B60R 19/34 296/187.03 |
| 2015/0069784 A1* | 3/2015 | Song | B60J 5/0497 296/180.2 |
| 2015/0224949 A1* | 8/2015 | Cuddihy | B60R 19/023 293/118 |
| 2017/0129448 A1* | 5/2017 | Farooq | B60R 19/023 |
| 2017/0247014 A1* | 8/2017 | Farooq | B60R 19/12 |
| 2018/0029551 A1* | 2/2018 | Gruebl | B60R 19/38 |

* cited by examiner

SECONDARY BUMPER ASSEMBLY

BACKGROUND

The Global Technology Regulation (GTR) and the New Car Assessment Program (NCAP) in Europe and Japan specify leg-injury criteria for pedestrian protection. The regulations are aimed at preventing the legs of pedestrians from sliding under a vehicle bumper during a vehicle-pedestrian impact.

Vehicles, such as light duty trucks and sport utility vehicles (SUVs), have a relatively high bumper height to provide ground clearance to allow the vehicles clear speed bumps, curbs, parking blocks, inclined driveway ramps, hills, rough roads, etc. In addition, the vehicles may also have off-road capabilities where obstacles can preclude having any components below the bumper. On the other hand, the relatively high bumper heights could allow the legs of pedestrians to bend and slide under the bumper.

DETAILED DESCRIPTION

A bumper assembly includes a crush can, a bumper extending along a longitudinal axis supported by the crush can, and a secondary bumper assembly. The secondary bumper assembly includes a secondary bumper extending along the longitudinal axis and a hand-actuated release. The secondary bumper assembly is supportable by the bumper. The hand-actuated release is supported by the secondary bumper and has an arm attachable to the bumper. The arm is moveable between an engaged position for engagement with the bumper and a disengaged position for disengagement from the bumper.

The hand-actuated release can include a slider. The slider can be operably connected to the arm to move the arm between the engaged and disengaged positions.

The arm and the slider can be fixed relative to each other. The slider can be slideable between a first position and a second position. When the slider is in the first position, the arm can be in the engaged position. When the slider is in the second position, the arm can be in the disengaged position.

The arm and the slider can be unitary. A spring can bias the slider toward the first position.

The secondary bumper can include an aperture proximate the slider. The aperture can be sized to accommodate a hand extending through the aperture.

A clip can be operably connected to the hand-actuated release. The clip can have a flange moveable between a deployed position and a retracted position. The flange can be engageable with one of the bumper and the crush can in the deployed position. The flange can be disengageable with the one of the bumper and the crush can in the retracted position.

The one of the bumper and the crush can include a housing for slideably receiving the clip. The housing can include a slot sized to receive the flange when the flange is in the deployed position.

The hand-actuated release can include a slider operably connected to the clip. A cable can connect the slider and the clip. The slider can be slideable between a first position and a second position. When the slider is in the first position, the flange can be in the deployed position. When the slider is in the second position, the flange can be in the retracted position.

A secondary bumper assembly includes a secondary bumper extending along a longitudinal axis, and a hand-actuated release supported by the secondary bumper. The hand-actuated release has an arm. The arm is attachable to a vehicle. The arm is moveable between an engaged position for engagement with the vehicle, and a disengaged position for disengagement with the vehicle.

The hand-actuated release can include a slider. The slider can be operably connected to the arm to move the arm between the engaged and disengaged positions. The slider can be slideable between a first position and a second position. When the slider is in the first position, the arm can be in the engaged position. When the slider is in the second position, the arm can be in the disengaged position.

A clip can be operably connected to the hand-actuated release. The clip can have a flange moveable between a deployed position and a retracted position.

The hand-actuated release can include a slider operably connected to the clip. The slider can be slideable between a first position and a second position. When the slider is in the first position, the flange can be in the deployed position. When the slider is in the second position, the flange can be in the retracted position.

The secondary bumper can include a secondary bumper wall, and a first secondary bumper leg and a second secondary bumper leg spaced from each other and extending from the secondary bumper wall in a first direction away from the secondary bumper wall. The hand-actuated release can be attached to an inner surface of the first secondary bumper leg. The first secondary bumper leg can include a recess extending through the first secondary bumper leg. The arm can be extendable through the recess.

With reference to the Figures, wherein like numerals indicate like parts throughout the several views, a bumper assembly 12 includes a crush can 24, a bumper 14 extending along a longitudinal axis supported by the crush can 24, and a secondary bumper assembly 34.

The secondary bumper assembly 34 is supportable by the bumper 14 and includes a secondary bumper 36 extending along the longitudinal axis and a hand-actuated release 48 having an arm 50 attachable to the bumper 14 supported by the secondary bumper 36. The arm 50 of the hand-actuated release 48 is moveable between an engaged position for engagement with the bumper 14 and a disengaged position for disengagement with the bumper 14.

Figure 1:
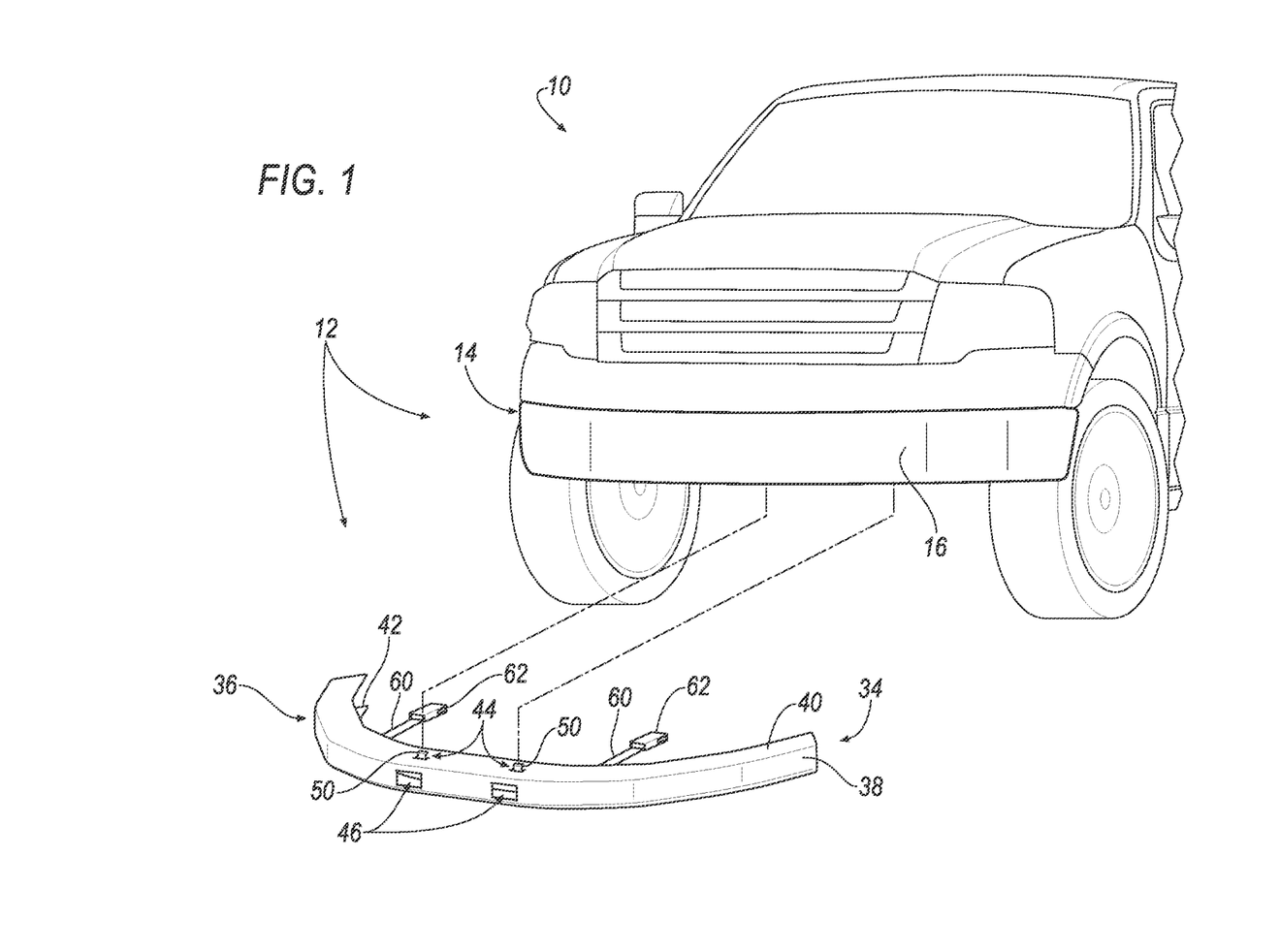
FIG. 1 is an exploded perspective view of a front portion of a vehicle, with a secondary bumper assembly exploded from the rest of the vehicle.

As shown in FIG. 1, vehicles, such as light duty trucks, SUVs, etc., can have a high bumper assembly 12 height relative to the ground. The high bumper assembly 12 height can help provide clearance to assist a vehicle 10 in avoiding hitting obstacles on the ground when, for example, the vehicle 10 is operating in off-road conditions. In addition, the vehicle 10 may be operating in areas where pedestrians are not likely to be present. Under these and other conditions, being able to remove the secondary bumper assembly 34 from the vehicle 10 by hand and without tools can be desirable.

In other conditions, such as where pedestrians are more likely to be present, it may be desirable to lower the height of the bumper assembly 12 relative to the ground. Adding the secondary bumper assembly 34 to the vehicle 10 can lower the bumper assembly 12 height relative to the ground to assist in protecting pedestrians from sliding under the vehicle 10 in a vehicle-pedestrian impact. Under these and other conditions, an ability to mount the secondary bumper assembly 34 to the vehicle 10 by hand and without tools may be desirable.

Figure 2:
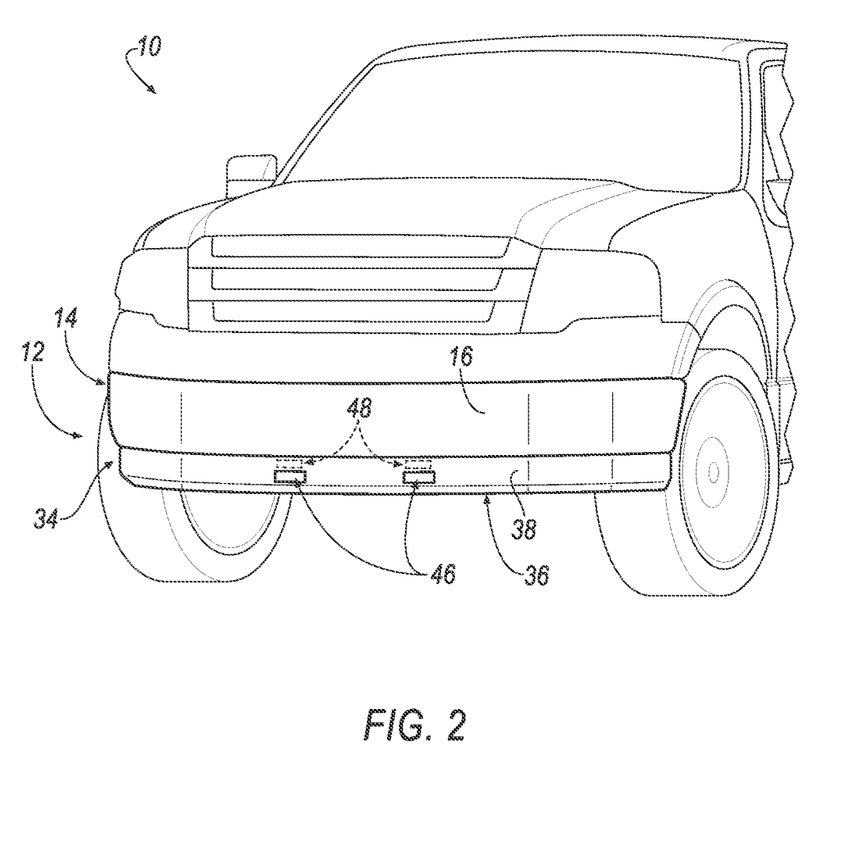
FIG. 2 is a perspective view of the front portion of the vehicle, with a secondary bumper supported by a bumper of the vehicle.

As shown in FIGS. 1 and 2, the bumper assembly 12, including the secondary bumper assembly 34, can be mountable to a front end of the vehicle 10. Additionally, or alternatively, the bumper assembly 12, including the secondary bumper assembly 34, can be mountable to a rear end of the vehicle 10. While the vehicle 10 shown in FIGS. 1 and 2 is a light duty truck, the vehicle 10 may be any type of passenger or commercial vehicle, such as a car, a truck, an SUV, a taxi, a bus, etc.

Figure 3:
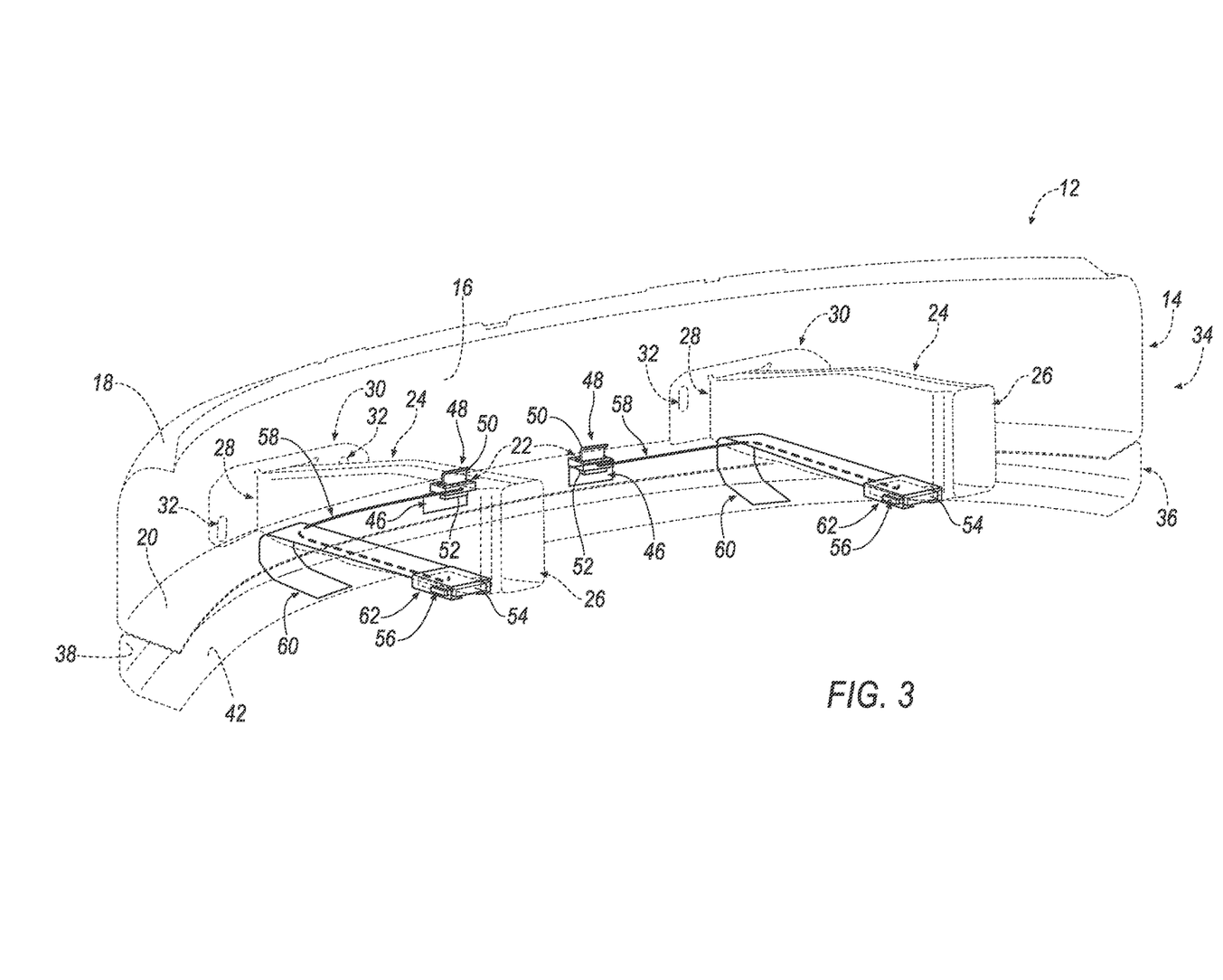
FIG. 3 is a rear perspective view of a bumper assembly.

One or more crush cans 24 can support the bumper 14. As shown in FIG. 3, for example, the bumper 14 can be supported by a first crush can 24 and a second crush can 24.

The first and second crush cans 24 can include proximal ends 26 attachable to the vehicle 10, e.g., a frame (not shown) of the vehicle 10. The proximal ends 26 of the first and second crush cans 24 can be directly attached to the frame by, e.g., welds, fasteners, adhesives, etc. Alternatively, the proximal ends 26 can be attached to rear plates (not shown).

The rear plates may be removably mounted to the vehicle 10, e.g., the frame. For example, the rear plates may define a plurality of holes and the frame of the vehicle 10 may also define holes that align with the holes of the rear plates. Fasteners, such as threaded bolts, can extend through the holes of the rear plates and into the aligned holes of the frame to removably mount the rear plates to the frame of the vehicle 10. Alternatively, the rear plates may be welded to or otherwise fixedly joined to the vehicle 10 in any suitable manner. The rear plates may be formed from metal, such as steel, aluminum, etc.

Each of the first and second crush cans 24 can extend along a longitudinal axis from the proximal end 26 to the distal end 28. The distal ends 28 of the first and second crush cans 24 can be connected to the bumper 14. For example, as shown in FIG. 3, the distal ends 28 of the first and second crush cans 24 can be attached to front plates 30, and the front plates 30 can be attached to the bumper 14. The distal ends 28 can be fixed to the front plates 30 in any suitable manner, such as with welds, fasteners, adhesives, etc.

As discussed above, the distal ends 28 of the first and second crush cans 24 can be removably mounted to the bumper 14. For example, the front plates 30 can define a plurality of holes 32, and the bumper 14 can define holes (not shown) that align with the plurality of holes 32 of the front plates 30. Fasteners (not shown), such as threaded bolts, can extend through the plurality of holes 32 of the front plates 30 into the aligned holes of the bumper 14 to removably mount the front plates 30 to the bumper 14. The front plates 30 may alternatively be welded to or otherwise fixedly joined to the bumper 14 in any other suitable manner. The front plates 30 may be formed of metal, such as steel, aluminum, etc.

With continued reference to FIG. 3, the first and second crush cans 24 can taper between the proximal ends 26 and the distal ends 28. For example, the taper may be constant from the proximal ends 26 to the distal ends 28. The first and second crush cans 24 may be manufactured from ultra-high strength steel ("UHSS"). As one example, the first and second crush cans 24 may be formed of Boron steel having a yield strength of 1500 MPa. The first and second crush cans 24 can therefore be lightweight with a high strength-to-weight ratio, and still maintain a sequence of collapse from the distal ends 28 to the proximate ends of the first and second crush cans 24 during an impact event to help absorb energy from the impact.

The bumper assembly 12 also includes a bumper 14. The bumper 14 can be supported by one or more crush cans 24, such as the first and second crush cans 24 as discussed above. Alternatively, the bumper 14 can be directly attached to the vehicle 10, such as the frame.

Referring to FIGS. 1-3, the bumper 14 extends along a longitudinal axis. The bumper 14 can include a bumper wall 16, a first bumper leg 18, and a second bumper leg 20. The first and second bumper legs 18, 20 can be spaced from each other and extend away from the bumper wall 16 in a first direction. The bumper 14, e.g., the bumper wall 16 and the first and second bumper legs 18, 20, can be curvilinear to a tangent at a longitudinal center of the bumper 14.

The first and second bumper legs 18, 20 can be fixed to the bumper wall 16. The bumper wall 16, the first bumper leg 18, and the second bumper leg 20 may be integral, i.e., formed together as a single, continuous unit. For example, the bumper wall 16, the first bumper leg 18 and the second bumper leg 20 may be simultaneously molded together, e.g., via injection molding. Alternatively, the bumper wall 16, the first bumper leg 18, and/or the second bumper leg 20 may be separately formed, and subsequently fixed together in any suitable way, e.g., using adhesives, fasteners, fusing, welding, etc. The bumper wall 16, the first bumper leg 18, and the second bumper leg 20 may be formed from any suitable material, including metal, plastic, a composite, etc. The bumper wall 16, the first bumper leg 18, and the second bumper leg 20 may be formed from the same materials, or from dissimilar materials.

As shown in FIG. 3 and further discussed below, the bumper 14 can define one or more openings 22. Each of the one or more openings 22 can be sized to permit the arm 50 of the hand-actuated release 48 to extend through the opening 22, and to move between the engaged position for engagement with the bumper 14 and the disengaged position for disengagement from the bumper 14. For example, as shown in FIG. 3, the second bumper leg 20 defines a first opening 22 and a second opening 22.

The bumper 14 can be configured to deform during an impact event to assist in absorbing energy from an impact. Alternatively, the bumper 14 can be configured to remain rigid during the impact.

Figures 4A, 4B:
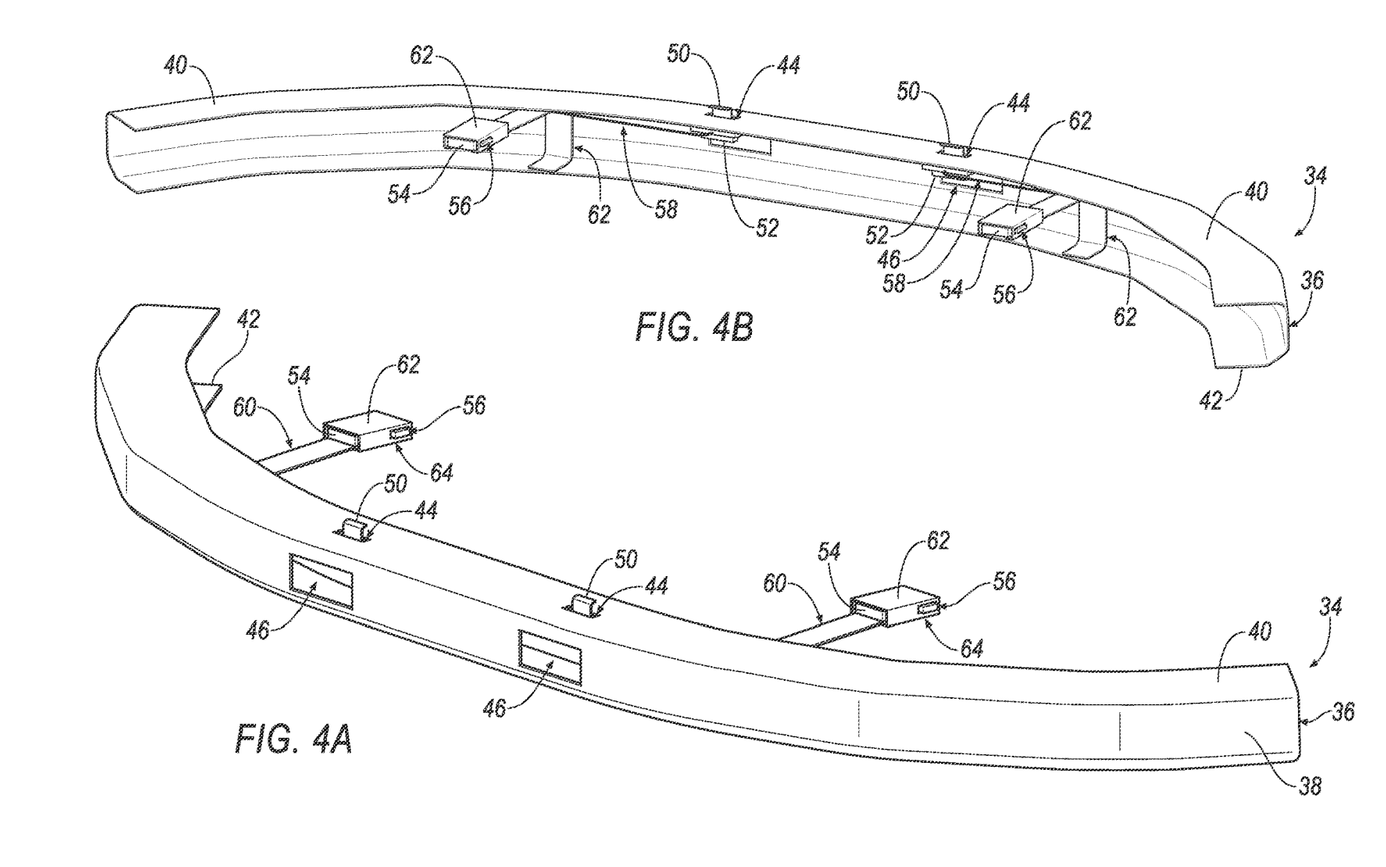
FIG. 4A is a perspective front view of the secondary bumper assembly.
FIG. 4B is a perspective rear view of the secondary bumper assembly.

The secondary bumper assembly 34 includes the secondary bumper 36 extending along the longitudinal axis, and one or more hand-actuated releases 48. At least one of the one or more hand-actuated releases 48 is supported by the secondary bumper 36. For example, as shown in FIGS. 3 and 4B, a first hand-actuated release 48 and a second hand-actuated release 48 are supported by the secondary bumper 36.

As used herein, the phrase "hand-actuated release" refers to a mechanism that can be operated by hand, without the need for other tools.

The secondary bumper assembly 34 is supportable by the vehicle 10. The secondary bumper assembly 34 can be supported by, e.g., the frame, one or more crush cans 24, such as the first and/or the second crush cans 24, the bumper 14, etc. For example, as shown in FIGS. 1-3, the secondary bumper assembly 34 is removably mounted to the bumper 14.

Referring to FIGS. 1-4B, the secondary bumper 36 extends along a longitudinal axis. The secondary bumper 36 can include a secondary bumper wall 38, a first secondary bumper leg 40 and a second secondary bumper leg 42. The first and second secondary bumper legs 40, 42 can be spaced from each other and extend away from the secondary bumper wall 38 in the first direction, i.e., in the same direction that the first and second bumper legs 18, 20 of the bumper 14 extend away from the bumper wall 16 when the secondary bumper assembly 34 is supported by the vehicle 10, such as the frame, the bumper assembly 12 (e.g. the bumper 14, and/or one or more crush cans 24, such as the first and/or the second crush cans 24), etc. The secondary bumper wall 38 and the first and second bumper legs 18, 20 can be curvilinear to a tangent at a longitudinal center of the bumper 14.

The first and second secondary bumper legs 40, 42 can be fixed to the secondary bumper wall 38. The secondary bumper wall 38, the first secondary bumper leg 40, and the second secondary bumper leg 42 may be integral, i.e., formed together as a single, continuous unit. For example, the secondary bumper wall 38, the first secondary bumper leg 40 and the second secondary bumper leg 42 may be simultaneously molded together, e.g., by injection molding.

Alternatively, the secondary bumper wall 38, the first secondary bumper leg 40, and/or the second secondary bumper leg 42 may be separately formed, and subsequently fixed together in any suitable way, e.g., using adhesives, fasteners, fusing, welding, etc.

The secondary bumper wall 38, the first secondary bumper leg 40, and the second secondary bumper leg 42 may be formed from any suitable material, including metal, plastic, a composite, etc. The secondary bumper wall 38, the first secondary bumper leg 40, and the second secondary bumper leg 42 may be formed from the same materials, or from dissimilar materials.

The first and second secondary bumper legs 40, 42 may be shaped to match a shape of the first and second bumper legs 18, 20. For example, the first and second secondary bumper legs 40, 42 can extend along an arc that is substantially the same as an arc of the first and second bumper legs 18, 20. In this way, the first secondary bumper leg 40 of the secondary bumper 36 may abut, e.g., the second bumper leg 20 of the bumper along a length of the first secondary bumper leg 40 when the secondary bumper assembly 34 is supported by the bumper 14.

As shown in FIGS. 1 and 4A-B, the secondary bumper 36 can define one or more recesses 44. Each of the one or more recesses 44 can be sized to permit the arm 50 of a hand-actuated release 48 to extend through the recess 44, and to move between the engaged position for engagement with the vehicle 10 and the disengaged position for disengagement from the vehicle 10. For example, as shown in FIGS. 1 and 4A-B, the first secondary bumper leg 40 defines a first recess 44 and a second recess 44.

The first and second recesses 44 defined by the first secondary bumper leg 40 can be configured to align with the first and second openings 22 defined by the second bumper leg 20, as shown in FIG. 3. In this way, when the first recess 44 is aligned with first opening 22 and the second recess 44 is aligned with the second opening 22, the arm 50 of the first hand-actuated release 48 supported by the secondary bumper 36 can extend through both the first recess 44 and the first opening 22, and the arm 50 of the second hand-actuated release 48 can extend through both the second recess 44 and the second opening 22.

The secondary bumper 36 can define one or more apertures 46. Each of the one or more apertures 46 can be sized to accommodate a hand extending through the apertures 46. As shown in FIGS. 1-4B, for example, the secondary bumper wall 38 can define a first aperture 46 and a second aperture 46. Each of the one or more apertures 46, such as the first and second apertures 46, can be defined proximate a hand-actuated release 48, e.g., a slider 52 of a hand-actuated release 48, as further discussed below.

The secondary bumper 36 can be configured to deform during an impact event to assist in absorbing energy from an impact. Alternatively, the secondary bumper 36 can be configured to remain rigid during the impact.

The secondary bumper assembly 34 includes one or more hand-actuated releases 48. At least one of the one or more hand-actuated releases 48 is supported by the secondary bumper 36. For example, as shown in FIGS. 3-4B, the first and second hand-actuated releases 48 are supported on an inner surface of the first secondary bumper leg 40. The first and second hand actuated-releases can be supported by the secondary bumper 36 in any suitable way, e.g., with adhesives, fasteners, fusing, welding, etc.

At least one of the one or more hand-actuated releases 48 has the arm 50. As shown in FIGS. 1 and 3-5B, the first hand-actuated release 48 includes the arm 50 and the second hand-actuated release 48 includes the arm 50.

Figure 5A:
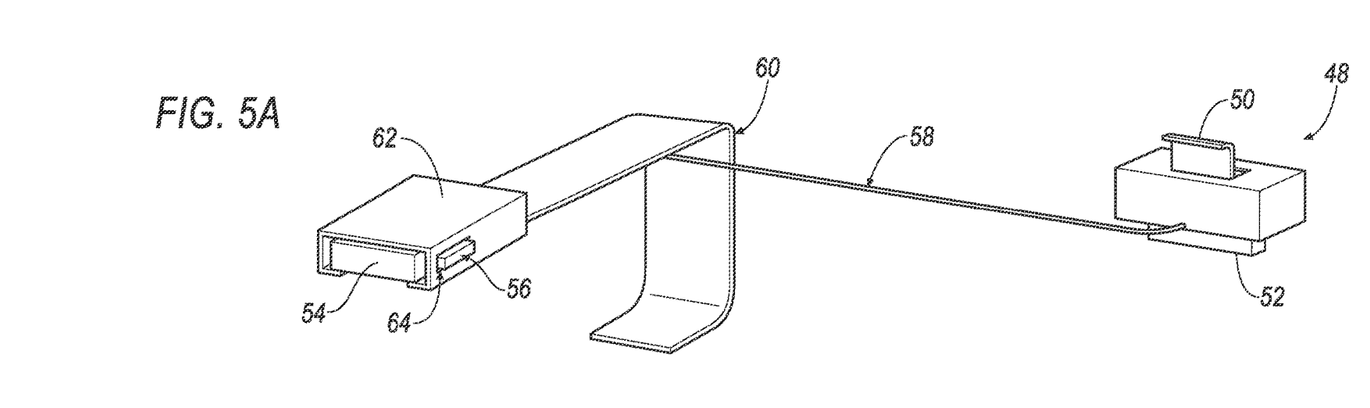
FIG. 5A is a perspective view of a hand-actuated release.
Figure 5B:
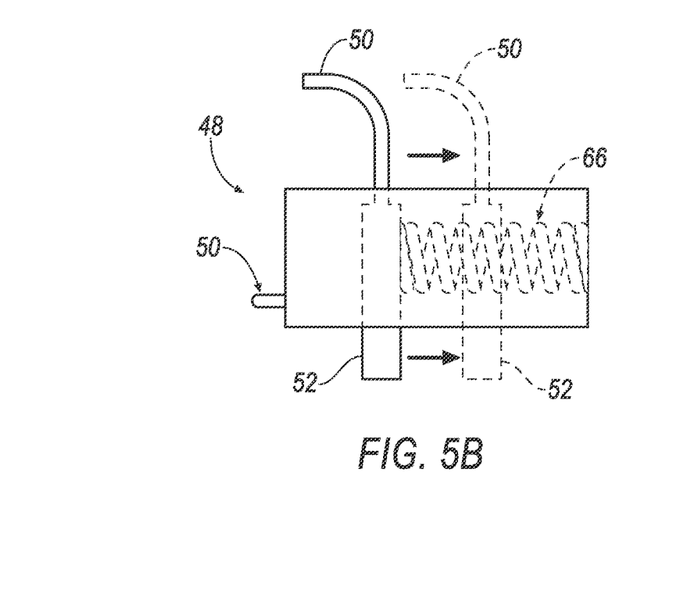
FIG. 5B is a side view of an arm and a slider with the arm shown in an engaged position and the slider shown in a first position in solid line, and the arm shown in a disengaged position and the slider shown in the second position in hidden line.

As shown in FIG. 5B, the arm 50 is moveable between an engaged position and a disengaged position. In the engaged position (shown in solid line in FIG. 5B), the arm 50 is attachable to the vehicle 10, such as the frame, the first and/or the second crush can 24, the bumper 14, etc., and the secondary bumper assembly 34 is supportable by the vehicle 10. In the disengaged position (shown in hidden line in FIG. 5B), the arm 50 is detachable from the vehicle 10, and the secondary bumper assembly 34 is removable from the vehicle 10.

For example, as shown in FIG. 3, the arm 50 of the first hand-actuated release 48 extends through the first recess 44 of the first secondary bumper leg 40 and though the first opening 22 of second bumper leg 20, and the arm 50 of the second hand-actuated release 48 extends through the second recess 44 of the first secondary bumper leg 40 and though the second opening 22 of the second bumper leg 20. Each of the arms 50 is in the engaged position. In this way, the secondary bumper assembly 34 is supported by the bumper 14.

The one or more hand-actuated releases 48 can also include a slider 52. As shown in FIGS. 3 and 4B, the first hand-actuated release 48 includes the slider 52 and the second hand-actuated release 48 includes the slider 52.

The slider 52 can be operably connected to the arm 50. For example, referring to FIG. 5B, the slider 52 and the arm 50 can be unitary, i.e., formed from a single, monolithic part. In this way, the slider 52 and the arm 50 are fixed relative to each other such that the slider 52 can move the arm 50 between the engaged and the disengaged position.

For example, as shown in FIG. 5B, the slider 52 can be slideable between a first position (shown in solid line in FIG.

5B), and a second position (shown in hidden line in FIG. 5B). When the slider 52 is in the first position, the arm 50 is in the engaged position, and when the slider 52 is in the second position, the arm 50 is in the disengaged position.

The slider 52 can be biased in the first position. The slider 52 can be biased in the first position in any suitable way, such as with springs, elastomeric materials, etc. For example, as shown in FIG. 5B, a spring 66 biases the slider 52 in the first position. As such, the arms 50 of the hand-actuated releases 48 can also be biased in, e.g., the engaged position.

A clip 54 can be operably connected to a hand-actuated release 48, such as the first and second hand-actuated releases 48. As shown in FIGS. 3-4B, for example, the first hand-actuated release 48 is operably connected to a first clip 54 via a first cable 58, and the second hand-actuated release 48 is operably connected to a second clip 54 via a second cable 58.

A bracket 60 can attach the clip 54 to the secondary bumper 36. For example, as shown in FIGS. 3 and 4B, a first bracket 60 and a second bracket 60 can be fixed to the inner surface of the secondary bumper 36. The first clip 54 can attach to an end of the first bracket 60, and the second clip 54 can attach to an end of the second bracket 60. Each of the ends of the first and second brackets 60 can extend in a direction away from the secondary bumper 36. For example, the ends of the first and second brackets 60 can extend past a length of the first secondary bumper leg 40, as shown in FIGS. 3-4B.

Figure 5C:
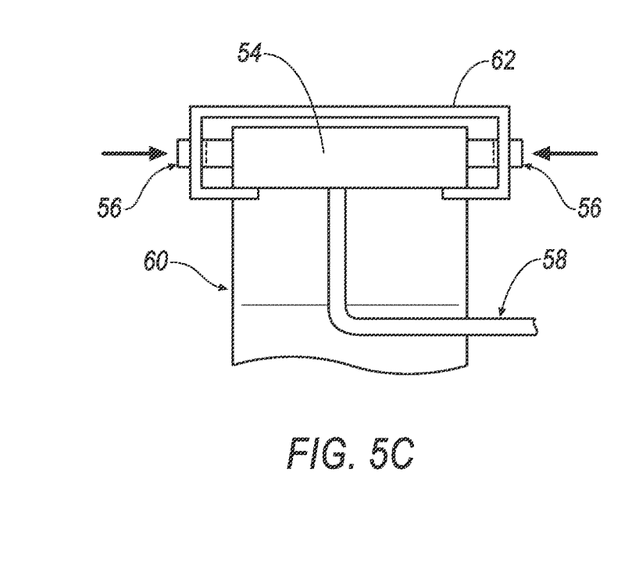
FIG. 5C is an end view of a housing and a clip.

Referring to FIG. 5C, the clips 54, such as the first and second clips 54, can include a flange 56 moveable between a deployed position and a retracted position. In the deployed position, the flange 56 is engageable with the vehicle 10, e.g., the frame, the first and/or the second crush can 24, the bumper 14, etc.

As shown in FIGS. 3 and 5A, the cables 58 (such as the first and second cables 58) can connect between the sliders 52 of the hand-actuated releases 48 (such as the first and second hand actuated releases) and the clips 54 (such as the first and second clips 54). In this way, moving the sliders 52 from the first position to the second position can move the flanges 56 of the clips 54 from the deployed position to the retracted position, as shown in 5C.

The cables 58 can be of any suitable type, such as a Bowden cable, etc. At least a portion of the first and second cables 58 can be supported by the first and second brackets 60, respectively. The first and second cables 58 can be supported by the first and second brackets 60 in any suitable way, e.g., adhesives, fasteners, etc.

A housing 62 for slideably receiving a clip 54, such as the first and second clips 54, can be attached to the vehicle 10, e.g., the frame, the bumper, the first or second crush cans 24, etc. For example, as shown in FIG. 3, a first housing 62 is attached to the first crush can 24 and a second housing 62 is attached to the second crush can 24.

The housings 62, such as the first and second housings 62, can include slots 64. Referring to FIG. 5C, the slots 64 can be sized to receive the flanges 56 from the clips 54 when the clips 54 are in the deployed position.

As discussed above, the secondary bumper 36 can define apertures 46 proximate a hand-actuated release 48, e.g., a slider 52 of the hand-actuated release 48. The apertures 46 can be sized to accommodate a hand extending through the aperture 46. As shown in FIGS. 1-4B, for example, the secondary bumper wall can define the first aperture 46 and second aperture 46.

Users can therefore extend their hands through the first and second apertures 46, and move the sliders 52 of the first and second hand-actuated releases 48 from the first position to the second position. In this way, the arms 50 of first and second hand-actuated releases 48 can move from the engaged position to the disengaged position, the flanges 56 from the first and second clips 54 can move from the deployed position to the retracted position, and the secondary bumper assembly 34 can be removed from the vehicle 10 by hand and without tools.

Additionally, users can extend their hands through the first and second apertures 46, and move the sliders 52 from the second position to the first position. In this way, the arms 50 of the first and second hand-actuated releases 48 can move from the disengaged to the engaged position, and the flanges 56 of the first and second clips 54 can move from the retracted to the deployed position, thereby mounting the secondary bumper assembly 34 on the vehicle 10 by hand and without tools.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A bumper assembly comprising:
a crush can;
a bumper extending along a longitudinal axis supported by the crush can; and
a secondary bumper assembly releasably supported by the bumper and including a secondary bumper extending along a longitudinal axis and a hand-actuated release supported by the secondary bumper having an arm attachable to the bumper, the arm moveable between an engaged position for engagement with the bumper and a disengaged position for disengagement from the bumper;
wherein the hand-actuated release includes a slider, the slider operably connected to the arm to move the arm between the engaged and disengaged positions.

2. The bumper assembly of claim 1, wherein the arm and the slider are fixed relative to each other, wherein the slider is slideable between a first position and a second position, wherein when the slider is in the first position the arm is in the engaged position, and wherein when the slider is in the second position the arm is in the disengaged position.

3. The bumper assembly of claim 2, wherein the arm and the slider are unitary.

4. The bumper assembly of claim 2, further comprising a spring biasing the slider toward the first position.

5. The bumper assembly of claim 2, wherein the secondary bumper includes an aperture proximate the slider, the aperture sized to accommodate a hand extending through the aperture.

6. The bumper assembly of claim 1, further comprising a clip operably connected to the hand-actuated release and having a flange moveable between a deployed position and a retracted position, the flange engageable with one of the bumper and the crush can in the deployed position and disengageable with the one of the bumper and the crush can in the retracted position.

7. The bumper assembly of claim 6, wherein the one of the bumper and the crush can include a housing for slideably receiving the clip.

8. The bumper assembly of claim 7, wherein the housing includes a slot sized to receive the flange when the flange is in the deployed position.

9. The bumper assembly of claim 6, wherein the slider is operably connected to the clip.

10. The bumper assembly of claim 9, wherein a cable connects the slider and the clip.

11. The bumper assembly of claim 9, wherein the slider is slideable between a first position and a second position, wherein when the slider is in the first position the flange is in the deployed position, and wherein when the slider is in the second position the flange is in the retracted position.

12. A secondary bumper assembly comprising:
 a secondary bumper extending along a longitudinal axis;
 a hand-actuated release supported by the secondary bumper and having an arm attachable to a vehicle, the arm being moveable between an engaged position for engagement with the vehicle and a disengaged position for disengagement with the vehicle; and
 a clip operably connected to the hand-actuated release and having a flange moveable between a deployed position and a retracted position.

13. The secondary bumper assembly of claim 12, wherein the hand-actuated release includes a slider, the slider operably connected to the arm to move the arm between the engaged and disengaged positions, wherein the slider is slideable between a first position and a second position, wherein when the slider is in the first position the arm is in the engaged position, and wherein when the slider is in the second position the arm is in the disengaged position.

14. The secondary bumper assembly of claim 12, wherein the hand-actuated release includes a slider operably connected to the clip.

15. The secondary bumper assembly of claim 14, wherein a cable connects the slider and the clip.

16. The secondary bumper assembly of claim 12, wherein a slider is slideable between a first position and a second position, wherein when the slider is in the first position the flange is in the deployed position, and wherein when the slider is in the second position the flange is in the retracted position.

17. The secondary bumper assembly of claim 12, wherein the secondary bumper includes a secondary bumper wall, and a first secondary bumper leg and a second secondary bumper leg spaced from each other and extending from the secondary bumper wall in a first direction away from the secondary bumper wall.

18. The secondary bumper of claim 17, wherein the hand-actuated release is attached to an inner surface of the first secondary bumper leg, the first secondary bumper leg including a recess extending through the first secondary bumper leg, and the arm extendable through the recess.

19. A secondary bumper assembly comprising:
 a secondary bumper extending along a longitudinal axis; and
 a hand-actuated release supported by the secondary bumper and having an arm attachable to a vehicle, the arm being moveable between an engaged position for engagement with the vehicle and a disengaged position for disengagement with the vehicle;
 wherein the secondary bumper includes a secondary bumper wall, and a first secondary bumper leg and a second secondary bumper leg spaced from each other and extending from the secondary bumper wall in a first direction away from the secondary bumper wall; and
 wherein the hand-actuated release is attached to an inner surface of the first secondary bumper leg, the first secondary bumper leg including a recess extending through the first secondary bumper leg, and the arm extendable through the recess.

* * * * *